E. H. ROYER.
FENDER.
APPLICATION FILED MAY 29, 1915.
1,168,114.
Patented Jan. 11, 1916.
2 SHEETS—SHEET 1.
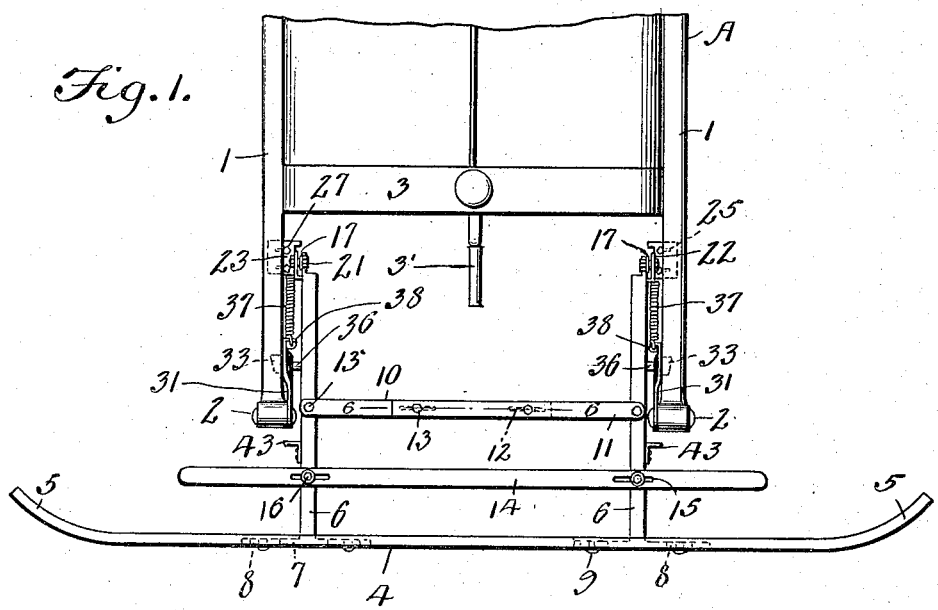
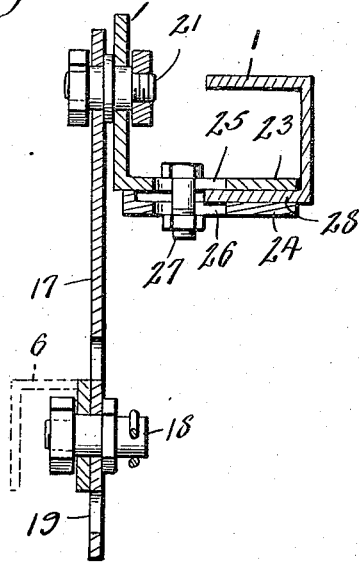
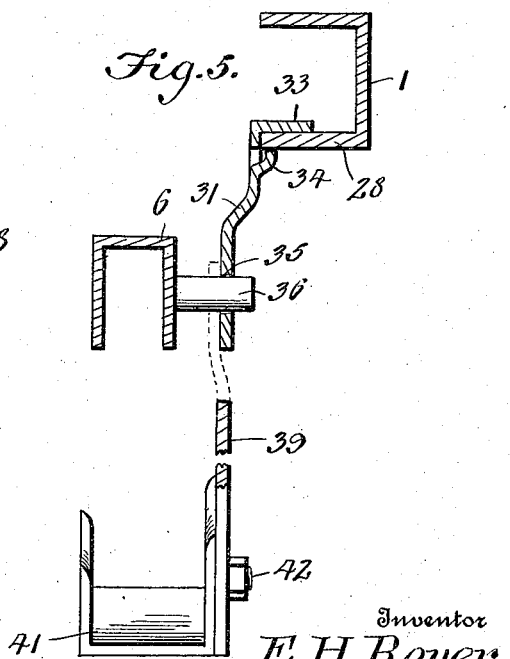
Witnesses
Inventor
E. H. Royer,
By Victor J. Evans
Attorney E. H. ROYER.
FENDER.
APPLICATION FILED MAY 29, 1915.
1,168,114.
Patented Jan. 11, 1916.
2 SHEETS—SHEET 2.
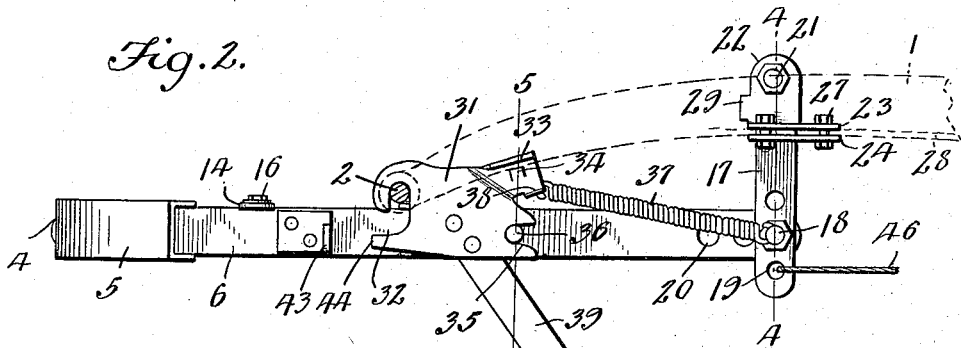
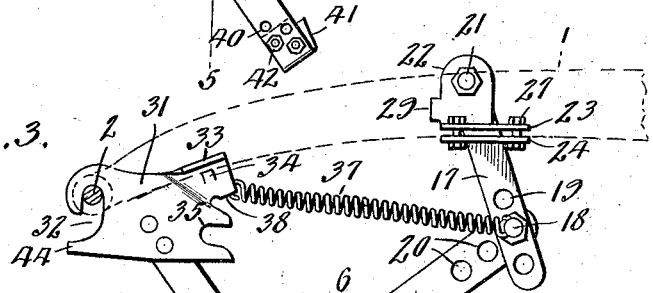
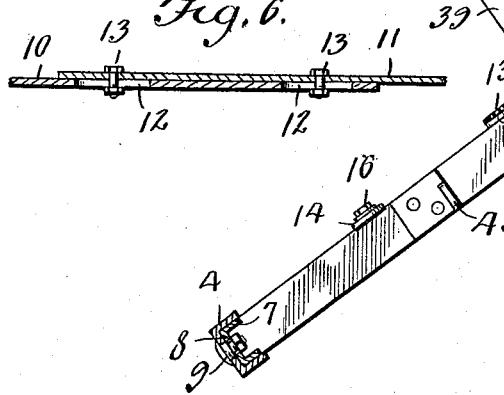
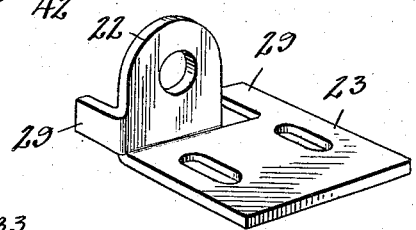
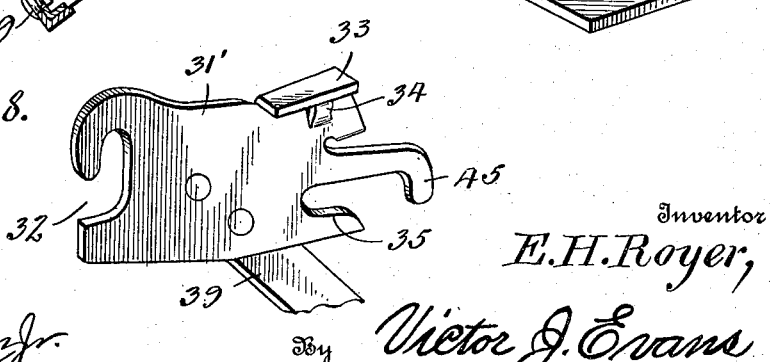
Witnesses
Inventor
E. H. Royer,
By Victor J. Evans
Attorney

UNITED STATES PATENT OFFICE.

ELMER H. ROYER, OF PHILADELPHIA, PENNSYLVANIA.

FENDER.

1,168,114.  Specification of Letters Patent.  Patented Jan. 11, 1916.

Application filed May 29, 1915. Serial No. 31,212.

*To all whom it may concern:*

Be it known that I, ELMER H. ROYER, a citizen of the United States, residing at Philadelphia, in the county of Philadelphia and State of Pennsylvania, have invented new and useful Improvements in Fenders, of which the following is a specification.

This invention relates to fenders especially designed for use upon automobiles and similar vehicles, the object in view being to produce a simple, cheap and reliable fender capable of being attached in a few moments to an automobile, the said fender being adapted to be tripped and thrown into operative position by contact with a person or object and being also adapted to be tripped by a manually operable device under the control of the driver in his seat in the machine.

A further object of the invention is to produce a fender of the class above referred to embodying various features of adjustment whereby the fender as a whole is adapted to frames of different sizes, widths and the like thus making the fender universal in its application to the frames of automobiles and other motor propelled vehicles.

With the above and other objects in view, the invention consists in the novel construction, combination and arrangement of parts, as herein described, illustrated and claimed.

In the accompanying drawings: Figure 1 is a plan view showing the fender of this invention applied to the frame of an automobile. Fig. 2 is an enlarged side elevation of the fender shown in its raised position and the relation thereof to the frame of an automobile. Fig. 3 is also a side elevation of the same parts showing the position assumed thereby when the fender is dropped to its operative position. Fig. 4 is an enlarged fragmentary section on the line 4—4 of Fig. 2. Fig. 5 is a similar section on the line 5—5 of Fig. 2. Fig. 6 is an enlarged fragmentary section on the line 6—6 of Fig. 1. Fig. 7 is an enlarged detail perspective view of one of the clamping jaws of one of the link supporting members. Fig. 8 is a detail perspective view showing a slightly modified form of fender supporting member.

Referring to the drawings A generally designates the frame of an automobile comprising the usual side bars 1, 2 designating the shackle bolts by means of which the front springs (not shown) are connected to the extreme forward ends of the side bars 1, the said shackle bolts serving as fastening means for the fender supporting members of this invention as illustrated in Figs. 2 and 3.

3 designates the radiator of the machine and 3' the usual hand crank for starting the engine.

In carrying out the present invention, the fender frame comprises a front fender bar 4 which extends across the front of the machine and is preferably of sufficient width to also overlap or extend in front of the wheels, the end portions of the fender bar 4 being curved rearwardly as shown at 5 to brush aside persons or objects and prevent them from coming in contact with the wheels and frame of the machine.

The front fender bar 5 is preferably of channel iron as shown, for example, in Fig. 2 with the flanges thereof facing rearwardly. Extending rearwardly from the fender bar 4 are two side arms 6 each of which is also preferably of channel iron with the flanges thereof facing downwardly as shown, for example, in Figs. 4 and 5. At their forward extremities, the bars 6 are provided with T-shaped heads or flanges 7 and these are formed with slots 8 to receive bolts 9 by means of which the side arms 6 are fastened to the front bar 4, the slots and bolts permitting the said arms 6 to be adjusted toward and away from each other for the purpose of accommodating the fender frame to vehicle frames of different widths. In addition to the front fender bar, the fender is shown as comprising a rear fender bar made in two overlapping sections 10 and 11 one of which is provided with slots 12 and the other with bolts 13 thus rendering the bar 10 longitudinally extensible to agree with the necessary distance between the side arms 6, the extremities of the bar 10 being fastened to the side arms at 13. Between the bars 4 and 10 are one or more bars 14 formed with longitudinal slots 15 to receive bolts or screws 16 by means of which the bar or bars 14 are fastened to the side arms 6, also permitting the arms 6 to be adjusted toward and away from each other.

The rear extremities of the side arms 6 are supported by fender suspending links 17 which are pivotally attached at their upper ends to the side bars 1 of the vehicle frame and which have the rear extremities of the side arms 6 pivotally connected thereto at 18. Each of the links 17 is formed with a number of holes 19 to receive the pivot bolt 18 thereby enabling the fender to be adjusted in the desired relation to the frame of the machine when the fender frame is in its elevated and lowered positions. Likewise the side arms 6 are provided with longitudinal series of holes 20 to enable the fender frame to be set forwardly or rearwardly as may be found necessary.

Each of the fender suspending links 17 is pivotally connected by a bolt 21 or its equivalent to an upwardly extending ear or lug 22 on the main clamping jaw 23 of a link supporting member which comprises in addition to the jaw 23 a second jaw 24, the said jaws being provided with elongated slots 25 and 26 through which are inserted bolts 27 the object of which is to permit the jaws 25 and 26 to bind against opposite sides of one of the flanges 28 of the adjacent side bar 1 as illustrated, for example, in Fig. 4. The main jaw 23 is also provided with inwardly extending stops 29 for limiting the forward and backward swinging of the links 17 under the operation of the fender as hereinafter set forth.

Secured to the shackle bolts 2 hereinabove described are two stationary fender supporting members 31 best shown in Figs. 2 and 3. For this purpose each fender supporting member 31 is provided with an L-shaped open ended slot 32 to enable the member 31 to be passed over the shackle bolt 2 without removing said shackle bolt from the frame 1 and the terminal eye of the spring which is connected to said frame in a manner well understood by those familiar with the art to which this invention appertains. Each fender supporting member is further held in place by means of a lip 33 which overhangs the flange 28 of the side bar 1 of the vehicle frame as shown in Fig. 5, the under side of the flange 28 being engaged by an outwardly struck lip 34 forming an integral part of the member 31, the parts 33 and 34 engaging the flange 28 of the bar 1 (see Fig. 5) preventing the fender supporting member 31 from swinging on the shackle bolt 2 as indicated in Figs. 2 and 3.

In its rear end each member 31 is formed with a rearwardly opening slot 35 which receives a projection 36 on the adjacent side arm 6 of the fender, the projection 36 being shown in the form of a pin or stud which is held normally in the slot 35 by means of one of a pair of coiled contractile springs 37 each having one end connected to an attaching lip 38 on the member 31 and the other end connected to the pivot or bolt 18 which connects the adjacent side arm 6 with the respective suspending link 17. Extending downwardly from each of the members 31 is a stirrup carrying arm 39 having series of holes 40 adjacent to its lower end admitting of the adjustable attachment thereto of a U-shaped stirrup 41 fastened in place relatively to the arm 39 by means of bolts 42 or the equivalent thereof.

43 designates a stop one of which is provided on each of the side arms 6 the same being adapted to come into contact with a stop shoulder 44 on the adjacent supporting member 31 so that in case the fender strikes against a heavy vehicle or a stationary object, the shoulders 43 and 44 will meet and temporarily prevent the fender from dropping so as to thereby protect the vehicle by which the fender is carried. In lieu of the stop arrangement just referred to, each of the fender supporting members one of which is shown at 31' in Fig. 8 may be provided with a pendent stop projection 45 against which the adjacent pin 36 will come in contact when the fender is thrust rearwardly, the fender being thus temporarily supported in its normal elevated position.

46 designates a flexible tripping element such as a cord or cable having one end attached to the lower extremity of one of the suspending links 17, said cord or cable extending rearwardly to a point within reach of the operator who by pulling thereon may trip the fender when he sees the necessity of dropping the front end of the fender to prevent an accident. Two of such cords or cables 46 may, of course, be employed running to each of the suspending links 17.

From the foregoing description, taken in connection with the accompanying drawings it will now be understood that the fender as a whole is normally supported in the elevated position shown in Fig. 2 by reason of the fact that the springs 37 acting on the links 17, hold the fender frame forwardly with the projections 36 in the slots 35. When the fender is struck, the projections 36 are moved out of the slots 35 and the side arms of the fender drop into the stirrups 41 by which they are supported so that the front fender bar 4 will clear the ground or road surface. The fender is easily returned to its elevated position by lifting the front bar thereof and allowing the springs 13 to return the projections 36 into the slots 35. In case the fender strikes against a heavy object, either moving or stationary, the fender as a whole is temporarily held in its elevated position thus preventing injury to the machine carrying the fender.

Having thus described my invention, I claim:

1. In a vehicle fender, a fender frame embodying a front fender bar, side arms fastened at their forward ends to said bar and extending rearwardly therefrom, oscillatory fender suspending links connecting the side arms of the fender frame to the vehicle frame, fender supporting members fixedly attached to the vehicle frame, and projections on the side arms of the fender frame engaging said fender supporting members to uphold the fender and adapted in the rearward thrust of the fender to become disengaged from said fender supporting members, permitting the front end of the fender to drop.

2. In a vehicle fender, a fender frame embodying a front fender bar, side arms fastened at their forward ends to said bar adjustable longitudinally of the latter and extending rearwardly therefrom, oscillatory fender suspending links connecting the side arms of the fender frame to the vehicle frame, fender supporting members fixedly attached to the vehicle frame, and projections on the side arms of the fender frame engaging said fender supporting members to uphold the fender and adapted in the rearward thrust of the fender to become disengaged from said fender supporting members, permitting the front end of the fender to drop.

3. In a vehicle fender, a fender frame embodying a front fender bar, side arms fastened at their forward ends to said bar and extending rearwardly therefrom, oscillatory fender suspending links connecting the side arms of the fender frame to the vehicle frame, fender supporting members fixedly attached to the vehicle frame, and projections on the side arms of the fender frame engaging said fender supporting members to uphold the fender and adapted in the rearward thrust of the fender to become disengaged from said fender supporting members, permitting the front end of the fender to drop, and springs connecting said links and fender supporting members to hold the projections on the side arms of the fender frame in engagement with the fender supporting members.

4. In a vehicle fender, a fender frame embodying a front fender bar, side arms fastened at their forward ends to said bar and extending rearwardly therefrom, oscillatory fender suspending links connecting the side arms of the fender frame to the vehicle frame, fender supporting members fixedly attached to the vehicle frame, projections on the side arms of the fender frame engaging said fender supporting members to uphold the fender and adapted in the rearward thrust of the fender to become disengaged from said fender supporting members, permitting the front end of the fender to drop, and means for limiting the downward movement of the fender frame.

5. In a vehicle fender, a fender frame embodying a front fender bar, side arms fastened at their forward ends to said bar and extending rearwardly therefrom, oscillatory fender suspending links connecting the side arms of the fender frame to the vehicle frame, fender supporting members fixedly attached to the vehicle frame, projections on the side arms of the fender frame engaging said fender supporting members to uphold the fender and adapted in the rearward thrust of the fender to become disengaged from said fender supporting members, permitting the front end of the fender to drop, and stirrups attached to said fender supporting members serving to arrest the downward movement of said side arms and support the fender in its lowest position.

6. In a vehicle fender, a fender frame embodying a front fender bar, side arms fastened at their forward ends to said bar and extending rearwardly therefrom, oscillatory fender suspending links connecting the side arms of the fender frame to the vehicle frame, link-supporting members embodying clamping jaws to engage the vehicle frame, fender supporting members fixedly attached to the vehicle frame, and projections on the side arms of the fender frame engaging said fender supporting members to uphold the fender and adapted in the rearward thrust of the fender to become disengaged from said fender supporting members, permitting the front end of the fender to drop.

7. In a vehicle fender, a fender frame embodying a front fender bar, side arms fastened at their forward ends to said bar and extending rearwardly therefrom, oscillatory fender suspending links connecting the side arms of the fender frame to the vehicle frame, link-supporting members embodying clamping jaws to engage the vehicle frame, fender supporting members fixedly attached to the vehicle frame, projections on the side arms of the fender frame engaging said fender supporting members to uphold the fender and adapted in the rearward thrust of the fender to become disengaged from said fender supporting members, permitting the front end of the fender to drop, and stops on said link supporting members to limit the swinging movements of the supporting links.

8. In a vehicle fender, a fender frame embodying a front fender bar, side arms fastened at their forward ends to said bar and extending rearwardly therefrom, oscillatory fender suspending links connecting the side arms of the fender frame to the vehicle frame, fender supporting members fixedly attached to the vehicle frame, projections on the side arms of the fender frame engaging said fender supporting members to uphold the fender and adapted in the rearward thrust of the fender to become disengaged from said fender supporting members, permitting the front end of the fender to drop, and stops arranged to limit the rearward thrust of the fender.

9. In a vehicle fender, a fender frame embodying a front fender bar, side arms fastened at their forward ends to said bar and extending rearwardly therefrom, oscillatory fender suspending links connecting the side arms of the fender frame to the vehicle frame, fender supporting members fixedly attached to the vehicle frame, projections on the side arms of the fender frame engaging said fender supporting members to uphold the fender and adapted in the rearward thrust of the fender to become disengaged from said fender supporting members, permitting the front end of the fender to drop, and manually controlled means for swinging said links to trip the fender.

In testimony whereof I affix my signature in presence of two witnesses.

ELMER H. ROYER.

Witnesses:
  ALFRED HARMER MILLER,
  ROBERT V. ARNOLD.

Copies of this patent may be obtained for five cents each, by addressing the "Commissioner of Patents, Washington, D. C."